J. A. CROSS.
SLING ATTACHMENT FOR HAY FORKS.
APPLICATION FILED NOV. 4, 1909.
963,121.
Patented July 5, 1910.
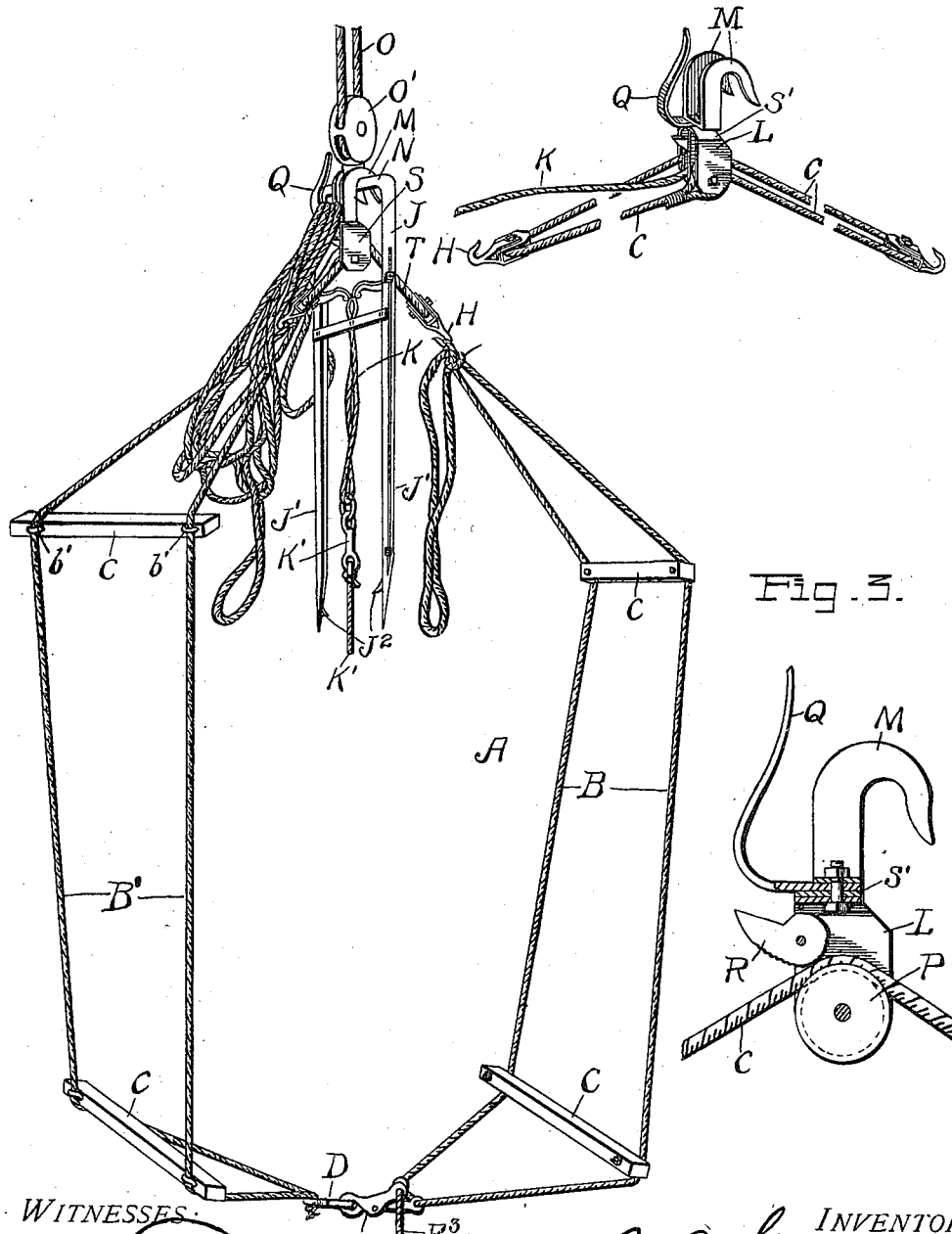
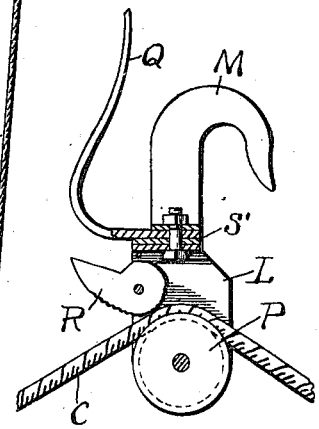
WITNESSES
INVENTOR
J. A. Cross,
BY
Attorney

UNITED STATES PATENT OFFICE.

JEROME A. CROSS, OF FULTONVILLE, NEW YORK.

SLING ATTACHMENT FOR HAY-FORKS.

963,121.

Specification of Letters Patent. Patented July 5, 1910.

Application filed November 4, 1909. Serial No. 526,220.

*To all whom it may concern:*

Be it known that I, JEROME A. CROSS, a citizen of the United States, residing at Fultonville, in the county of Montgomery and State of New York, have invented certain new and useful Improvements in Sling Attachments for Hay-Forks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in sling attachments for hay forks and it has for its object the provision of a simple, inexpensive and efficient attachment whereby means is provided for retaining the free ends of the ropes when not in use and readily detaching the same for use when desired.

To these ends and to such others as the invention may pertain the same consists in the novel construction, peculiar arrangement, combination and adaptation of parts, all as will be hereinafter described, shown in the accompanying drawings and then specifically defined in the appended claims.

The invention is clearly illustrated in the accompanying drawings, which, with the letters of reference marked thereon, form a part of this specification and in which:—

Figure 1 is a perspective view of a hay sling of ordinary construction, the same being shown as used in connection with a horse fork and with my improved attachment shown in position for use. Fig. 2 is an enlarged detail in perspective of the suspending hooks and rope holding hook which forms the subject matter of the present invention, and Fig. 3 is a sectional detail of the hook and its connections.

By the use of the horse fork, difficulty is experienced in removing the last of the hay from the wagon after the bulk of the load has been removed and it is customary to remove the latter part of the load by the use of a hay fork. The sling which I have shown is designed especially for use in connection with a horse fork with the view of providing means whereby the entire load may be removed without the necessity of the use of hand forks as is common.

Reference now being had to the details of the drawings by letter, A represents a hay sling, such as I employ in connection with the horse fork, the fork used being of any of the well known forms of horse hay forks such as are in common use. The sling consists of two ropes B and B', each of which is doubled and has its ends secured to metallic keepers D and E, the body portion of the rope being passed through eyelets or keepers $b$ and $b'$ carried by the cleats C. The keeper E is in the form of a latch or locking device capable of being released by a downward pull of a tripping rope which may be snapped or otherwise connected with a ring $E^2$ at the lower end of a trigger rope $E^3$.

J is a horse fork which may be of any of the forms of construction which are commonly used but, in the present instance, I have shown a fork of the type known commonly as a harpoon fork provided with the side arms J' and pivoted barb points $J^2$, which points are adapted to be thrown inward out of engagement with the load carried by the fork by the tripping of the toggle joint connection at a point adjacent to the upper end of the fork, this tripping being accomplished by a downward pull to the trip cord K'.

S designates a metallic casing divided by vertical partitions into three compartments within which are journaled three independent pulleys over which are passed strands of the loop rope T, which rope has connected at its ends suitable hooks H adapted to be engaged by the upper ends of the sling ropes B. Pivoted within the central compartment of the casing S is a cam pawl R adapted to engage the rope upon the pulley P and hold the same against backward movement, as will be readily understood. The casing S is bolted at its upper end to a cross bar S', the opposite ends of which bar are extended upward to form the hooks M, M to the rear of which hooks is provided a hook Q opening upward, said hook being designed to receive the coiled free end of sling attachment rope T when not in use.

O is a pulley, the casing of which has swivel connection with the cross bar N at the upper end of the hay fork over which pulley travels the rope O' which is used in raising the fork with its load.

From the foregoing description of the construction of my fork attachment, its operation will be readily understood. In loading hay or grain upon a wagon, the sling is opened out upon the wagon bed and the hay or grain is loaded thereon. Upon arriving at the barn or the point at which the hay is to be removed from the wagon, the horse fork is operated in the usual way for removing the upper part of the load, after which the sling ropes B are brought upward so that the sling will embrace that portion of the load still remaining upon the wagon and the looped upper ends of the sling ropes are hooked over the hooks H carried at the lower ends of the loop rope T passing over the pulleys contained in the casing S, the hooks M being hooked over the bar N of the horse fork. The trip rope K' is disengaged from its connection with the tripper rope K of the fork and the snap upon the ends of the rope is engaged with the ring E at the end of the sling trigger rope $E^3$. The bottom portion of the load being thus embraced within the sling is hoisted from the wagon by the means employed in hoisting loads carried by the fork.

Having thus described my invention, what I claim to be new and desire to secure by Letters Patent is:—

1. In combination with a pulley block casing divided into a plurality of compartments, a series of pulleys journaled one in each of said compartments, a hook fastened to said casing and adapted to engage over a hay fork to support the casing, a rope passing about two of said pulleys, tackle blocks having pulleys about which said rope passes and provided with hooks for engagement one with each end of a sling, a third pulley mounted in one of the compartments of said casing and about which a hoisting portion of the rope passes, and means for holding the purchase of said hoisting rope.

2. In combination with a pulley block casing divided into a plurality of compartments, a series of pulleys journaled one in each of said compartments, a hook fastened to said casing and adapted to engage over a hay fork to support the casing, a rope passing about two of said pulleys, tackle blocks having pulleys about which said rope passes and provided with hooks for engagement one with each end of a sling, a third pulley mounted in one of the compartments of said casing and about which a hoisting portion the rope passes, a pivotal gravity pawl mounted in the compartment in which said third pulley is journaled and adapted to engage the hoisting portion of the rope to hold the purchase.

In testimony whereof I hereunto affix my signature in the presence of two witnesses.

JEROME A. CROSS.

Witnesses:
T. A. SIMPSON,
WELLINGTON CROSS.